Figure 1:
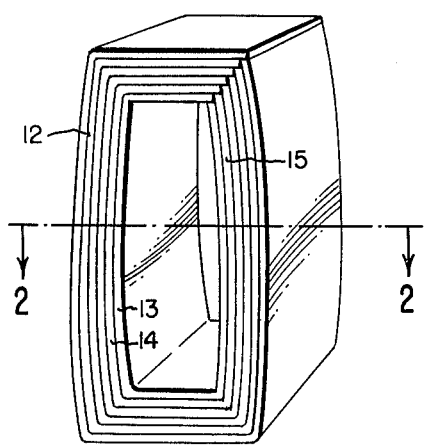

Jan. 4, 1966    J. C. HEFFERNAN    3,227,982
ELECTROMAGNET INDUCTOR AND SUPPORT THEREFOR
Original Filed April 5, 1957

INVENTOR
JAMES C. HEFFERNAN
BY
Kenway, Jenney, Witter & Hildreth
ATTORNEYS 3,227,982
ELECTROMAGNET INDUCTOR AND SUPPORT THEREFOR
James C. Heffernan, Beverly, Mass., assignor to Sylvania Electric Products, Inc., a corporation of Delaware
Original application Apr. 5, 1957, Ser. No. 650,956. Divided and this application June 10, 1963, Ser. No. 286,822
2 Claims. (Cl. 336—210)

This application is based on applicant's copending application Serial No. 650,956, filed April 5, 1957, now abandoned, of which the present application is a division.

This invention relates to the manufacture of electrical inductors and, more particularly, to the fabricating of inductors having improved core structures.

It has long been the practice in manufacturing inductors to wind one or more lengths of wire on a form and then to assemble a magnetic core about the windings. Depending upon the application to which the inductor is to be put, a variety of different coils or windings may be placed upon the form. For a simple choke coil, there might be only a single winding wrapped from a continuous length of wire. For complex power supply requirements, one or more primary and any number of secondary windings may be wound on the form.

The magnetic cores assembled about these windings are customarily of two general kinds. The first of these is the so called "E–I" core. E–I cores are usually produced by running sheet material through automatic punch presses to form similar laminations. The laminations are then stacked together to form a magnetic core in which the ends of the legs of the E positions abut the long lateral surfaces of the I portions. The two groups of laminations are than stacked together to form a magnetic core which is then assembled about a winding or windings, often in such a fashion that the windings are disposed about the center leg of the E.

The other type of core commonyl used is the C-core. C-cores are usually fabricated by winding strip metal tightly about an elliptical form in the general shape of an O. The tightly wound material is then impregnated with a high temperature cement and the cement is cured to form the strips into a substantially solid body. The body is then cut in halves to form two similar core members each of which has the general shape of a C. Each half is then properly shaped and polished to provide two pairs of closely matched abutting end surfaces. These end surfaces are brought together through the opening of a coil or coils. In some instances, two pairs of C-cores are used, a leg of each pair of cores passing through the opening in a coil or coils.

There are several disadvantages to transformers or other inductors fabricated with E–I type cores. Among the disadvantages is the considerable waste which results from the punching operation by which the laminations are formed. The actual equipment for the punching operation is costly, and the punching dies and stacking devices are also expensive. The performance of inductors manufactured with E–I cores also leaves something to be desired. Maximum efficiency in an inductor can only be achieved when the grain orientation of the metal of which the core is composed is consistent with the path of flux at all times in the finished inductor. It is inherently impossible to obtain the desired grain orientation in the punching process whereby E–I cores are formed because the flux path is at right angles to grain orientation in passing in either direction between the center and the outside legs of the core.

Because they are wound from a continuous strip of metal, C-type cores are free of the disadvantages stemming from improper grain orientation in the lamination metal. The faults of the C-type core are of another kind. The winding, cementing, curing, cutting, and polishing operations obviously can only be done at considerable expense. Not only is there a great deal of labor cost in fabricating such cores, but the materials and particularly the machinery necessary to perform the varied operations also add greatly to the cost.

Another problem common to both the E–I and the C-core is that of holding tight tolerances in the air gap when such a gap is desired in an inductor. With the E–I type core the likelihood of error in the air gap dimensions is extremely great. Errors can arise from the spacing of any one of the three ends of the legs of the E from the long side of the I, from a tilting of the E portion relative to the I portion in the plane of the core, or from rotational displacement between the two. In brief, the very existence of three air gaps provides three potential sources of error.

The possibility of similar errors with C type cores is somewhat less inasmuch as there are in some designs only two pairs of abutting end surfaces. The disposition of the abutting surfaces of the core members within the winding when C type cores are used is, however, of no help in maintaining an air gap of reasonably tight tolerances.

It is therefore, a primary object of the present invention to improve the efficiency and ease of fabrication of inductors.

Another object of the invention is to provide an inductor having an improved core.

Still another object of the invention is to provide a method for fabricating inductors which can be easily adapted to automatic machinery.

A further object of the invention is to provide a method for fabricating inductors which is easily adapted to high speed productions.

A still further object of the present invention is to provide a relatively inexpensive method for constructing and mounting inductors of high standards of quality and performance.

A primary feature of the invention is the fabrication of inductors having cores made from commercially available reels of strip magnetic material. A series of consecutive similar operations are performed on the strip. In each of these operations, a segment of the strip is bent into a desired shape and cut off. The length of the segment being bent and cut is increased during each separate operation. In this manner, segments bent into similar shapes are provided, and a group of such segments may be nested together to form a suitable core. Assembly of the core about the windings of the inductor is facilitated by a pre-existing curvature in the strip material which gives a bistable set to the material, especially helpful after bending, cutting, and nesting.

Another feature of the invention resides in the provision of four-sided laminations, each of which is formed by making three bends and a single cut. The symmetry of the nested laminations and their ability to be cut to any desired length, permits the construction of inductors which may have air gaps of any desired dimensions, but which may be closely and consistently held in each individual case.

Numerous other advantages stem from the practice of the invention. Only a single gap is formed in each lamination, thereby reducing the possibility of error in holding the dimensions of the air gap to close tolerances. Furthermore, the gaps are not concealed within the winding or windings. The advantages of unidirectional grain orientation are preserved in inductors manufactured with cores of the type utilized in the present invention because the grain orientation and flux path always coincide. Only three bends are used to form the four-sided lamination thus minimizing the harmful effects on the magnetic circuit of the inductor which sometimes result from bending operations. Not only is inductor efficiency improved, but the rise in temperature during operation is considerably reduced. Inductors made in accordance with the present invention are significantly reduced in weight compared to inductors fabricated in the manner of the prior art. Finally, inductors made in accordance with the present invention are capable of being mounted in a simple and novel manner.

Figure 3:
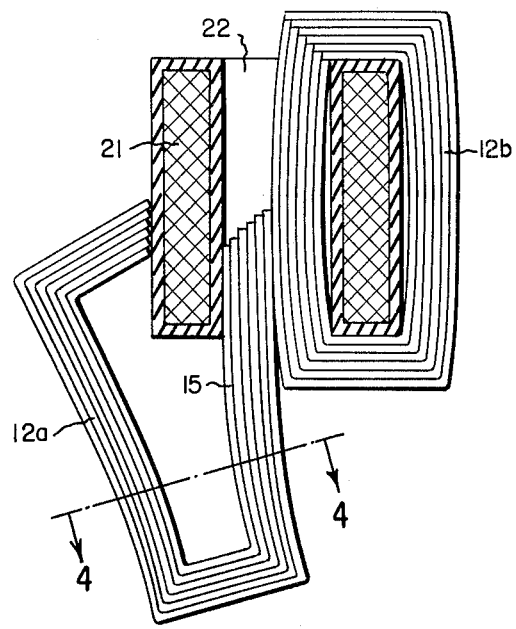
Figure 2:
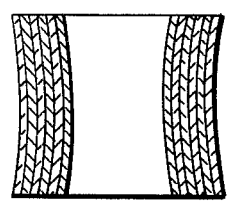
Figure 4:
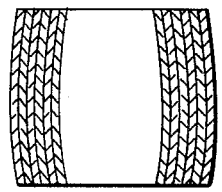
Figure 5:
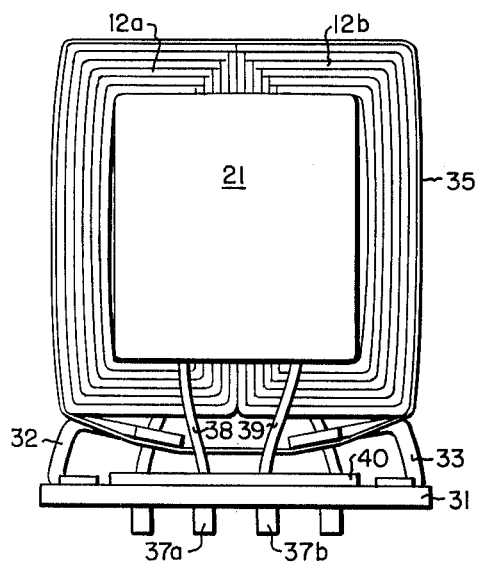
Figure 6:
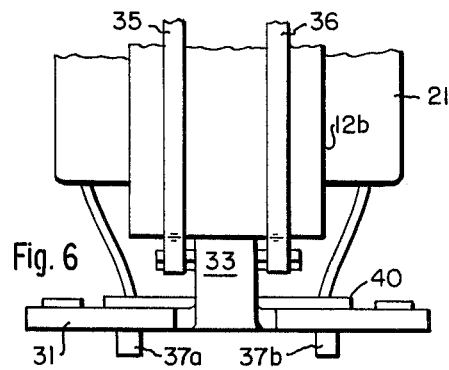

These and other objects and features of the invention will be more readily understood and appreciated from the following detailed description of a preferred embodiment thereof selected for purposes of illustration and shown in the accompanying drawings, in which:

FIG. 1 is a perspective view of a group of laminations after bending, cutting and nesting, FIG. 2 is a section taken through FIG. 1 along the lines 2—2, FIG. 3 is a view, partly in section, of an inductor in the process of construction, FIG. 4 is a section taken along the lines 4—4 through one of the core structures illustrated in FIG. 3, FIG. 5 is a front elevation of a completely assembled inductor, and FIG. 6 is a fragmentary side elevation of the inductor illustrated in FIG. 5 showing details of mounting structure.

In general, the invention pertains to a method of constructing an electrical inductor wherein a core is progressively formed by assembling laminations into a nested group after they are bent and cut from a continuous strip of magnetic material. FIG. 1 illustrates a group of laminations 12 nested to form a core. The magnetic material of which the laminations are formed is fed from a reel in a continuous length to a bending brake. In the brake, the first lamination 13 which is the internal and smallest lamination, is bent three times at right angles and cut from the strip. The next adjacent and next larger lamination 14 is formed and cut in the same way, the only difference being that the length of material from which the second lamination is bent and cut is somewhat longer than that from which the first lamination was formed. The second lamination is placed over the first, the third over the second, and so forth until the group such as illustrated in FIG. 1 is assembled.

(24)( STURGEON 88036 Pats day Dec. 11     A

In FIG. 2 a sectional view of the nested laminations of FIG. 1 illustrates the outwardly facing concavity of the laminations which gives rise to a bistable mechanical condition in the laminations which will be described in greater detail hereinbelow.

In FIG. 3 there is illustrated a coil or winding 21 which may be of generally annular configuration having a central opening 22 and formed in a conventional manner. The winding 21 may be a single winding, or any number or windings, depending upon the application to which the inductor is ultimately to be put. Usually it is desirable to interleave insulating paper or other suitable material between windings as is customary in fabricating inductors.

The nested group of laminations 12 is shown in two positions in FIG. 3. In the position at the left, the group of laminations or core 12a is shown with the gap sprung open to clear the thickness of the coil 21. As is indicated in the drawing, when the core 12a is sprung open, the leg 15 is passed through the opening in the coil 21. In the right hand portion of FIG. 3, the core 12b is shown in the position it assumes when the leg has passed entirely through coil 21 and the core has reassumed its shape as shown in FIG. 1.

It has been found that the strip magnetic material naturally assumes a curvature such as that indicated in FIG. 2 and that the curvature is retained when the laminations are formed and nested. However, when the leg 15 is sprung outwardly from the remainder of the core as is shown in FIG. 3 at the left, the laminations reverse their curvature and appear as they are shown in FIG. 4. This is essentially the bistable mechanical condition previously referred to. Most important for purposes of the present invention is the fact that after the core is assembled upon the coil, as shown at the right in FIG. 3, the laminations reassume the position they had as shown in FIGS. 1 and 2. Thus, the air gap between lamination ends as designed and built in during the formation of the core is maintained despite the spreading of the core to assemble it about the coil.

In FIG. 5 a substantially completed inductor made in accordance with the present invention is illustrated. Two cores 12a and 12b have been assembled in the manner indicated in FIG. 3 about the coil 21. A relatively heavy plate 31 punched from a single sheet of metal serves as the basic support member. Two T-shaped ears 32 and 33 are formed at opposite sides of the plate 31. The ears 32 and 33 are bent inwardly toward each other. A pair of binding straps 35 and 36 which bind the two core members together also pass over and enclose the ears. Thus, the inductor core is firmly held to the support member 31.

The central area of the mounting or support member 31 is punched out and an insulating plate 40 is riveted or otherwise attached to the support member to overlie the opening formed therein. A plurality of lugs 37 may be provided to permit external connection to the ends of the windings of the core 21. In the embodiment illustrated, the coil 21 is a single winding, the end 38 of that winding being connected to the lug 37a and the end 39 of the winding being connected to the lug 37b. Obviously, as many lugs as are necessary to make connection to the ends of the windings of coil 21 could be provided. In some instances, there might well be numerous leads extending from the various windings or coils and soldered or otherwise connected to suitable lugs extending through the insulating plate 40.

As may be more clearly seen in FIG. 6, the binding straps 35 and 36 pass completely around the core members 12a and 12b and over tabs extending from the ears 32 and 33. The binding straps are drawn tightly over the core members and the tabs on the ears. Thus, the inductor is firmly mounted and derives its entire support from the mounting plate 31. This is of importance when shielding of the transformer is desired, as for example, by enclosing the entire structure in a metallic container. With the mounting illustrated, the shielding container may be fabricated from very light material because primary support is entirely derived from the mounting plate and is not dependent upon the shielding container.

In other instances where shielding is unnecessary or undesirable, the entire assembly may be enclosed in a thermosetting plastic. One suitable process for such enclosing is that known by the trade-name "Fosterite." In this process, the assembled inductor is covered by an epoxy resin, then baked to cure the resin. An incidental benefit which is derived from the process in the prevention of mechanical vibration of the laminations which causes hum or other inductor noise unless the vibrations are damped out.

The invention should not be limited to the exact details of the embodiment shown, but only by the spirit and scope of the appended claims.

What is claimed is:

1. An inductor comprising a generally annular coil of wire, at least one formed core interlinked with said coil of wire, said core including a plurality of nested laminations forming substantially closed loops but having an air gap formed between the ends of said laminations, said air gap being continuous through said plurality of laminations, a mounting plate having ears extending therefrom and bent back upon said plate, and at least one flexible binding strap enclosing said plurality of laminations and said ears to secure said laminations to said mounting plate.

2. An inductor comprising a generally annular coil of wire including at least one winding, a pair of formed cores linked together by said coil, each of said formed cores comprising a plurality of nested laminations formed into substantially closed four-sided loops, an air gap being formed between the ends of said laminations, said air gap being continuous through said plurality of nested laminations and disposed at a corner of said four-sided loops, a mounting plate having ears extending therefrom, said ears being bent back toward each other and upon said plate, and at least one flexible binding strap enclosing said pair of formed cores and said ears to secure said cores to said plate.

References Cited by the Examiner

UNITED STATES PATENTS

| | | | |
|---|---|---|---|
| 2,401,984 | 6/1946 | Steinmayer | 336—211 |
| 2,595,820 | 5/1952 | Somerville | 336—211 |
| 2,960,756 | 11/1960 | Treanor | 29—155.58 |
| 3,014,268 | 12/1961 | Hefferman | 29—155.58 |

OTHER REFERENCES

Somerville: Abstract of application Serial No. 86,517, published February 5, 1952, 655, O.G. 275.

JOHN F. BURNS, *Primary Examiner.*

J. F. CAMPBELL, *Examiner.*